United States Patent
Czarnecki et al.

(10) Patent No.: US 12,208,357 B2
(45) Date of Patent: *Jan. 28, 2025

(54) DRYING SYSTEM WITH FLUIDIZED ADSORBENT

(71) Applicant: WHIRLPOOL CORPORATION, Benton Harbor, MI (US)

(72) Inventors: Philip J. Czarnecki, Saugatuck, MI (US); Muhammad Khizar, St. Joseph, MI (US); Nitin Minocha, Pune (IN); Mateusz Michal Wolowicz, Olawa County (PL)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 725 days.

This patent is subject to a terminal disclaimer.

(21) Appl. No.: 17/467,889

(22) Filed: Sep. 7, 2021

(65) Prior Publication Data

US 2023/0073631 A1    Mar. 9, 2023

(51) Int. Cl.
*D06F 58/46* (2020.01)
*B01D 53/12* (2006.01)
*B01J 8/38* (2006.01)
*F26B 3/08* (2006.01)

(52) U.S. Cl.
CPC .............. *B01D 53/12* (2013.01); *B01J 8/388* (2013.01); *F26B 3/082* (2013.01)

(58) Field of Classification Search
CPC .......... B01D 53/12; B01J 8/388; F26B 3/082; A47L 15/488; A47L 15/0042; A47L 15/486; A47L 15/481; A47L 15/0034

USPC .......................................................... 34/131
See application file for complete search history.

(56) References Cited

U.S. PATENT DOCUMENTS

| | | | |
|---|---|---|---|
| 9,078,557 B2 | 7/2015 | Delle et al. |
| 9,914,155 B2 | 3/2018 | Disch et al. |
| 10,143,986 B2 | 12/2018 | Ryu et al. |
| 10,730,008 B2 | 8/2020 | Schaumann et al. |

(Continued)

FOREIGN PATENT DOCUMENTS

| | | |
|---|---|---|
| DE | 100 40 548 A1 | 2/2001 |
| DE | 100 48 516 A1 | 4/2002 |

(Continued)

OTHER PUBLICATIONS

EP Search Report for EP Application No. 22 19 4477 dated Feb. 3, 2023, 7 pages.

*Primary Examiner* — John P McCormack
(74) *Attorney, Agent, or Firm* — Brooks Kushman P.C.

(57) ABSTRACT

A dishwasher includes a housing having walls defining a tub with an outlet for humid air to flow out from the tub and an inlet for dry air to flow into the tub. The dishwasher also includes a drying system with a fluidized bed containing an adsorbent material, and an air circuit for supplying air to fluidize the adsorbent material via an air inlet, with at least a portion of the air inlet in contact with at least one wall of the tub such that heat is transferred from the tub to the air. During a regeneration cycle, the air circuit supplies heated ambient air to the fluidized bed to regenerate the adsorbent material. During an adsorption cycle, the air circuit receives hot humid air from the tub to be dried by the adsorbent material through the fluidized bed and returned as dry air to the tub.

20 Claims, 5 Drawing Sheets

(56) References Cited

U.S. PATENT DOCUMENTS

2011/0120510 A1* 5/2011 Delle .................. A47L 15/481
                                                    134/115 R
2024/0081609 A1* 3/2024 Zhu ..................... A47L 15/488

FOREIGN PATENT DOCUMENTS

| EP | 2 301 409 A1 | 3/2011 | | |
|----|--------------|--------|---|---|
| EP | 2 640 503 B1 | 9/2013 | | |
| FR | 2879431 A1 * | 6/2006 | .......... | A47L 15/481 |
| WO | 2018/234915 A1 | 12/2018 | | |

* cited by examiner

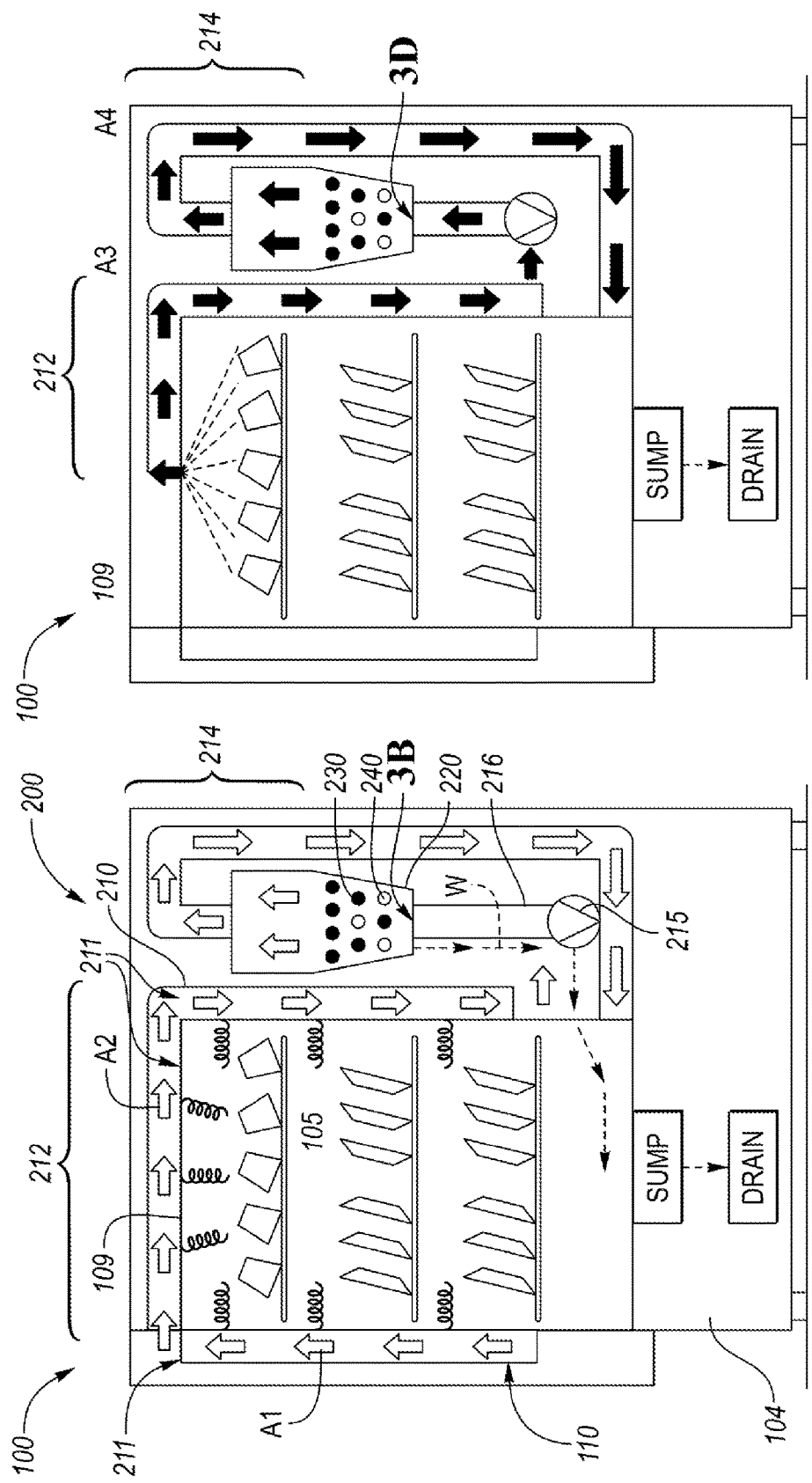

DRYING SYSTEM WITH FLUIDIZED ADSORBENT

TECHNICAL FIELD

The present application is directed to a drying system for a home appliance, and more particularly, improved adsorption and regeneration with a fluidized adsorbent material in the drying system.

BACKGROUND

Dishwashers have been and are becoming more and more standard in homes. Dishwashers may provide for automatic washing of a load, including for example, dishes and other cookware arranged on various racks within the tub of the dishwasher. Existing dishwashers include various conventional drying systems (e.g., with condensers, vents, fans, etc.) for drying the load. However, the conventional drying systems may have certain performance drawbacks including, for example, not completely drying the load, taking a longer time for drying, or allowing humid air to condense back onto the dishes and cookware within the tub. Thus, not only do consumers place importance on the speed and performance of the dishwasher, but energy efficiency of the drying capabilities is an important feature of dishwashers as well.

SUMMARY

According to one or more embodiments, a dishwasher includes a housing having walls defining a tub having a tub outlet for humid air to flow out from the tub, and a tub inlet for dry air to flow into the tub; and a drying system. The drying system includes a fluidized bed containing an adsorbent material in a fluidized state when air is flowed through the fluidized bed, and an air circuit having an air inlet for supplying air to fluidize the adsorbent material in the fluidized bed, and an air outlet connected to the tub inlet to flow air from the fluidized bed to the tub. At least a portion of the air inlet is in contact with at least one wall of the tub such that heat is transferred from the tub to the air therein. During a regeneration cycle, the air circuit supplies heated ambient air to the fluidized bed which is heated via heat transfer from the tub to the air inlet to regenerate the adsorbent material. During an adsorption cycle, the air circuit receives hot humid air at the air inlet from the tub outlet to be dried by the adsorbent material through the fluidized bed and returned as dry air to the tub via the tub inlet.

According to at least one embodiment, the heated ambient air may enter the air circuit as ambient air from a door assembly of the dishwasher. In one or more embodiments, the dishwasher may further include a sparger at an entrance of the fluidized bed, the sparger being configured alter a flow profile into the fluidized bed and suspend the adsorbent material in the fluidized state. In at least one embodiment, the fluidized bed may further include a carbon nanomaterial mixed with the adsorbent material. In certain embodiments, the dishwasher may further include a fan within the air circuit for drawing and flowing air therethrough for fluidizing the adsorbent material. According to at least one embodiment, during the regeneration cycle, a valve may block hot humid air from the tub from entering the air circuit. According to certain embodiments, during the adsorption cycle, a valve may block ambient air from entering the air circuit. In at least one embodiment, the fluidized bed may include a drain outlet connected to the tub to drain water formed during regeneration of the adsorbent material to the tub. In some embodiments, the heated ambient air may have a temperature of 35 to 45 degrees C.

According to one or more embodiments, a dishwasher includes a housing having walls defining a tub having a tub outlet for humid air to flow out from the tub, and a tub inlet for dry air to flow into the tub; and a drying system. The drying system includes a fluidized bed containing an adsorbent material in a fluidized state when air is flowed through the fluidized bed, and an air circuit having an air inlet for supplying air to fluidize the adsorbent material in the fluidized bed, and an air outlet connected to the tub inlet or a vent to flow air from the fluidized bed to the tub or an external environment, respectively. At least a portion of the fluidized bed is in contact with at least one wall of the tub such that heat is transferred from the tub to the adsorbent material therein. During a regeneration cycle, the adsorbent material is heated via heat transfer from the tub to the fluidized bed to regenerate the adsorbent material. During an adsorption cycle, the air circuit receives hot humid air at the air inlet from the tub outlet to be dried by the adsorbent material through the fluidized bed and returned as dry air to the tub via the tub inlet.

According to at least one embodiment, prior to an adsorption cycle, the air circuit may receive ambient air from the external environment to fluidize and cool the adsorbent material to increase adsorption potential of the adsorbent material. In at least one embodiment, during the regeneration cycle, a valve may block hot humid air from the tub from entering the air circuit and ambient air from the external environment from entering the air circuit. In at least one embodiment, during the adsorption cycle, a valve may block ambient air from entering the air circuit. In one or more embodiments, the fluidized bed may further include a carbon nanomaterial mixed with the adsorbent material. In at least one embodiment, the dishwasher may further include a sparger at an entrance of the fluidized bed, the sparger being configured to alter a flow profile into the fluidized bed and suspend the adsorbent material in the fluidized state. In at least one embodiment, the dishwasher may further include a fan within the air circuit for drawing and flowing air therethrough for fluidizing the adsorbent material.

According to one or more embodiments, a method of operating a dishwasher includes running a wash cycle to clean dishes loaded into a tub; initiating a dry cycle to supply hot air to the tub to dry the dishes and form hot humid air; and flowing the hot humid air into a drying system to fluidize adsorbent material in a fluidized bed and contact the fluidized adsorbent material within the fluidized bed of the drying system to absorb moisture from the hot humid air and form a dry air stream for supply to the tub and a hydrated adsorbent material. The method also includes during a subsequent wash cycle, regenerating the adsorbent material via heat transfer through a wall of the tub to an air circuit or the fluidized bed.

According to at least one embodiment, regenerating the adsorbent material may include heating ambient air via the heat transfer to the air circuit to form heated ambient air, and flowing the heated ambient air to fluidize the hydrated adsorbent material in the fluidized bed and contact the fluidized hydrated adsorbent material to regenerate the adsorbent material by releasing water therefrom. In a further embodiment, flowing the heated ambient air to fluidize the hydrated adsorbent material may include flowing the heated ambient air through a sparger into the fluidized bed. In one or more embodiments, the method may further include, prior to a subsequent dry cycle, and after regenerating the adsorbent material, flowing an ambient airflow to fluidize the adsorbent material and increase adsorption potential of the adsorbent material.

BRIEF DESCRIPTION OF THE DRAWINGS

FIGS. 3A & 3C are schematic side views of a drying system of a dishwasher during regeneration and adsorption, respectively, according to another embodiment;

FIGS. 3B & 3D are enlarged auxiliary top views of the sparger, according to certain embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a dishwasher includes a drying system to draw moisture out of the humid air being circulated through the dishwasher and return dry air back to the tub to facilitate drying of dishes in the tub of the dishwasher. The drying system includes an adsorbent material within a fluidized bed along an air circuit, with the air circuit including an ambient air line which is positioned against the tub wall or tub ceiling such that heat from the tub during the wash cycle can heat ambient air to be flowed through the fluidized bed to regenerate (i.e., release water from) the adsorbent material with the drained water being returned to the tub. A sparger can be used to optimize the flow of the heated ambient air through the fluidized bed during the regeneration cycle. Hot humid air is then flowed through the drying system and into the fluidized bed for drying via the adsorbent material during the drying cycle. As such, the fluidized bed keeps the adsorbent material suspended by the upward flow of air (i.e., hot ambient air or hot humid air) during the regeneration and the adsorption cycles to enhance both regeneration and adsorption of the drying system.

Figure 1:
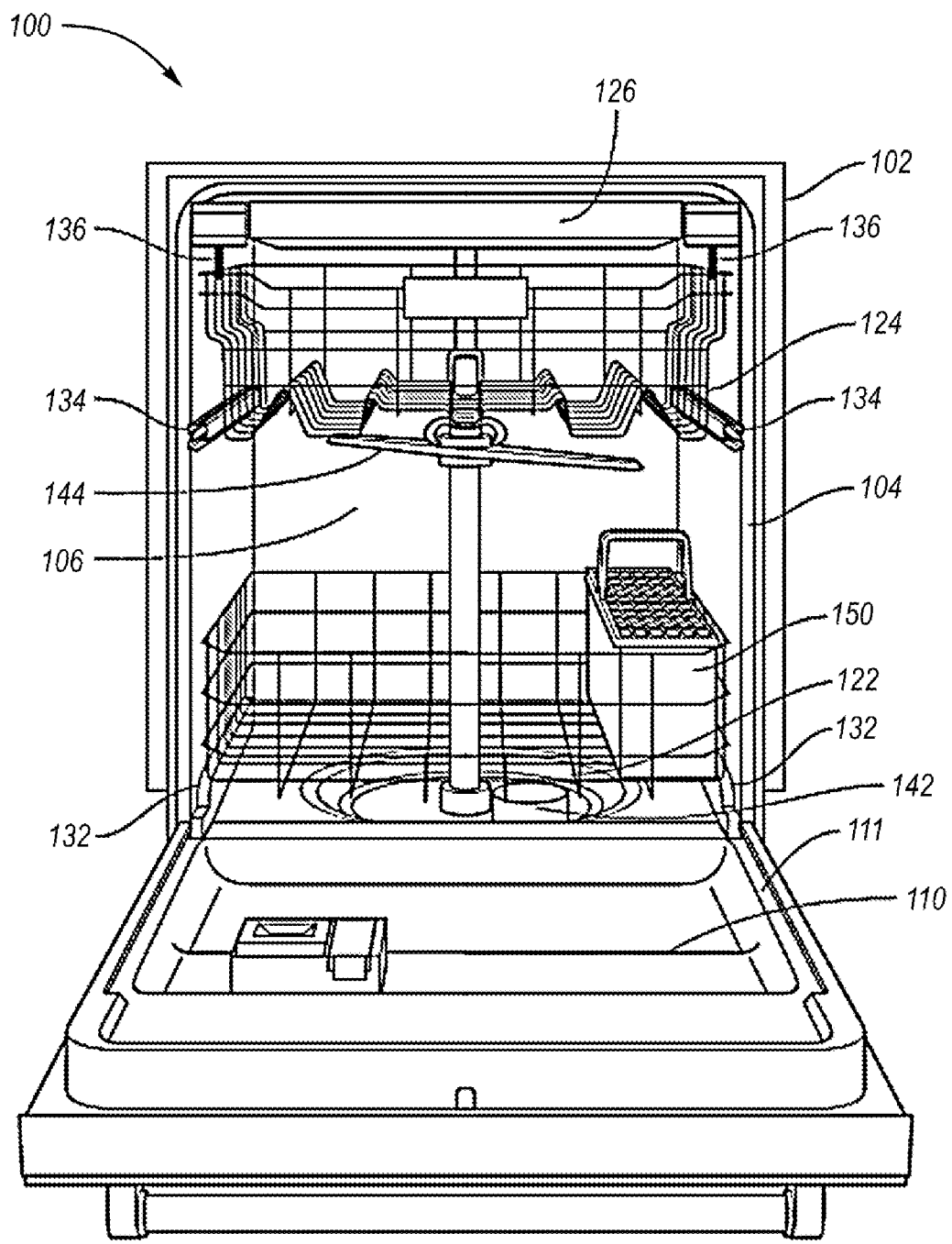
FIG. 1 is a front view of a dishwasher, according to an embodiment.

FIG. 1 illustrates an example front perspective view of a dishwasher 100 in accordance with one example embodiment. The dishwasher 100 may be an automated appliance configured to clean kitchen equipment placed within the dishwasher 100. The kitchen equipment may include tableware such as, for example, dishes, glassware, cutlery and other utensils, as well as food preparation equipment such as, for example, pots and pans, slicers, presses, and peelers. To perform the cleaning, the kitchen equipment is placed on racks 122, 124 inside a tub 104 of the dishwasher 100. A door assembly 110 is closed to form a watertight seal with the tub 104 from an exterior environment. Washing liquid and rinsing liquid is propelled from jets onto the kitchen equipment to clean dirt, grease, and other contaminants off the kitchen equipment. Though the examples described herein are generally related to in-home and personal use dishwashers, the same concepts may be applicable to commercial dishwashers as well.

The dishwasher 100 may include a frame 102 defining the exterior walls of the dishwasher 100. The frame 102 may be configured to interface with components exterior to the dishwasher 100 for installation, such as cabinets, countertops, floors, etc. The frame 102 may include a top, left side, right side, back, and bottom.

The tub 104 may define a hollow cavity or interior of the dishwasher for washing dishes. The tub 104 may define an open-face, or access opening 106 with walls at the top, left side, right side, back and bottom. A chassis (not individually labeled) may be arranged between the frame 102 and the tub 104 to maintain the tub 104 within the frame. The chassis may support the tub 104 and allow for maintaining space between the frame 102 and the tub 104.

A door assembly 110 may be arranged at a front of the dishwasher 100. The door assembly 110 may be attached to the dishwasher at the bottom front edge of the frame 102 and may be hinged thereat to move between open and closed positions. In the closed position, the door assembly 110 may seal the tub 104 at the access opening 106. In the open position, the cavity may be accessible via the access opening. In another example, the door assembly 110 may operate as a drawer that can be slidably extended outward from the front of the dishwasher 100 to move into the open position, and slidably retracted back into the dishwasher 100 to the closed position to seal the tub 104.

The tub 104 may house at least one dish rack. In the example shown in FIG. 1, the dishwasher 100 includes a first dish rack 122 and a second dish rack 124. It should be noted that while two dish racks are shown, this is only one example, and dishwashers 100 with more or fewer dish racks are possible. For instance, a dishwasher 100 may include a single rack or three or more racks.

Regardless of quantity or arrangement, the dish racks 122, 124 may be designed to hold the kitchen equipment in place for cleaning by the dishwasher 100. In many examples the dish racks 122, 124 are wire frame racks that allow for the flow of liquid within the tub 104. Although racks 122, 124 made of plastic, other materials are possible. The dish racks 122, 124 may generally include tines or other projections to allow the kitchen equipment to be washed to be held in a spaced apart relationship, such that the washing liquid and rinsing liquid can be projected onto the exposed kitchen equipment surfaces for cleaning these surfaces.

The racks are generally adapted to move between a retracted wash position within the tub 104 and an extended position outside the tub 104 for loading and unloading of the kitchen equipment to be washed. The racks typically include wheels or rollers for rolling movement along tracks or guides to the retracted and extended positions. In the illustrated example, the first rack 122 includes rollers or wheels that cooperate with a first track rail 132 formed at the bottom wall of the tub 104. A door track 111 may be arranged on the dishwasher door of the door assembly 110 as shown to allow the first rack to be rolled into an extended position when the door of the door assembly 110 is open. The second rack 124 is generally mounted within the tub 104 along a pair of second support rails 134 that cooperate with rollers associated with the side walls of the tub 104. Alternatively, the second rack 124 may be connected to a telescoping rail that allows the second rack to be extended out of the tub area when the door of the door assembly 110 is open. Thus, as shown, the first and second racks 122, 124 may be movable along their respective track rails 132, 134 to allow the respective racks 122, 124 to be slidable in and out of the access opening 106. A third rack or tray 126 may also be arranged on and above one or more of the racks 122, 124. In the illustrated example, the third rack 126 is arranged above the second rack 124, but other configurations are possible, such as a single rack with a tray, or multiple racks each with a third rack 126, or one rack with multiple trays. As with the dish racks 122, 124, the third rack 126 is configured to receive kitchen equipment for washing. In one non-limiting example, the third rack 126 may be designed to hold kitchen equipment such as cutlery or knives that, due to their dimensions, are more difficult to hold in a fixed spaced apart arrangement within the dish racks 122, 124 themselves.

The dishwasher 100 may also include a spray system for spraying liquid within the tub 104 during a wash cycle. In an example wash cycle, washing liquid including soap may first be sprayed onto the kitchen equipment, and then once washed, rinsing liquid without soap may then be sprayed onto the kitchen equipment. The spray system may include various jets for providing the liquid onto the surfaces of dishes during the automated washing and rinsing operations. The spray system may include a bottom sprayer 142, middle sprayer 144, and a top sprayer (not shown). In some examples, one or more of the sprayers are positioned at fixed locations within the tub 104. In other examples, one or more of the sprayers may be rotating spray arms with various nozzles configured to spray water onto the dishes maintained on the rack for cleaning. For instance, water jets on the spray arm may be angled so the water sprays out of the spray arms at an angle (e.g., ~45 degrees off the vertical) thereby causing the spray arms to rotate due to the pressure of the exiting water.

During loading, a user may open the door assembly 110 into the open position, pull the racks 122, 124 from the tub 104, and load the kitchen equipment onto the racks 122, 124. Once completed, the user may push the racks back into the tub 104, move the door assembly 110 back to the closed position, and initiate the wash cycle. Once the wash cycle has been completed, the user may again open the door assembly 110 to remove the cleaned kitchen equipment from the racks.

Before the user opens the door assembly to remove the cleaned kitchen equipment, the dishwasher undergoes a dry cycle after the wash cycle is complete. The dry cycle is implemented by a drying system 200, a portion of the drying system 200 is shown and described with reference to FIGS. 2-7. The drying system 200 of the dishwasher 100 promotes water evaporation from the kitchen equipment (or, interchangeably, the load) positioned on the racks 122, 124 after the wash cycle has concluded, and prevents humid air from condensing back onto the load. The evaporation aspect of the drying system can be achieved by either heating the load with hot water in the final rinse phase of the wash cycle, or by heating the load and air with an internal or external heater (not shown) during the drying cycle. In certain embodiments described herein, the drying system may include components to heat the load and air with an internal or external heater during the drying phase. The load and air heating can be achieved in a variety of ways, for example, by condensing the humidity onto the tub walls for draining; removing humid air by venting via natural convection (e.g., a door opening system); forcing the humid air out of the system via a fan; or absorbing the humidity from the air in the tub with an adsorbent, or desiccant, material.

According to one or more example embodiments, the drying system for the dishwasher 100 includes a drying system 200 with a fluidized bed containing an adsorbent material which can be regenerated via an ambient air stream heated via heat transferred from the tub to the air circuit. The drying system 200 thus not only facilitates regeneration of the adsorbent material during a regeneration cycle via fluidization of the adsorbent by flow therethrough of ambient air which is heated without an external heat source, but also improves adsorption of moisture during a drying cycle via fluidization of the adsorbent with respect to the hot humid air stream being flowed through the fluidized bed. As such, the overall energy efficiency of the dishwasher 100 can be improved.

Various embodiments of the drying systems 200, 400 will be shared with reference to the Figures. With reference to the Figures, like numerals are used to designate like structure throughout the drawings.

Figures 2A, 2B:
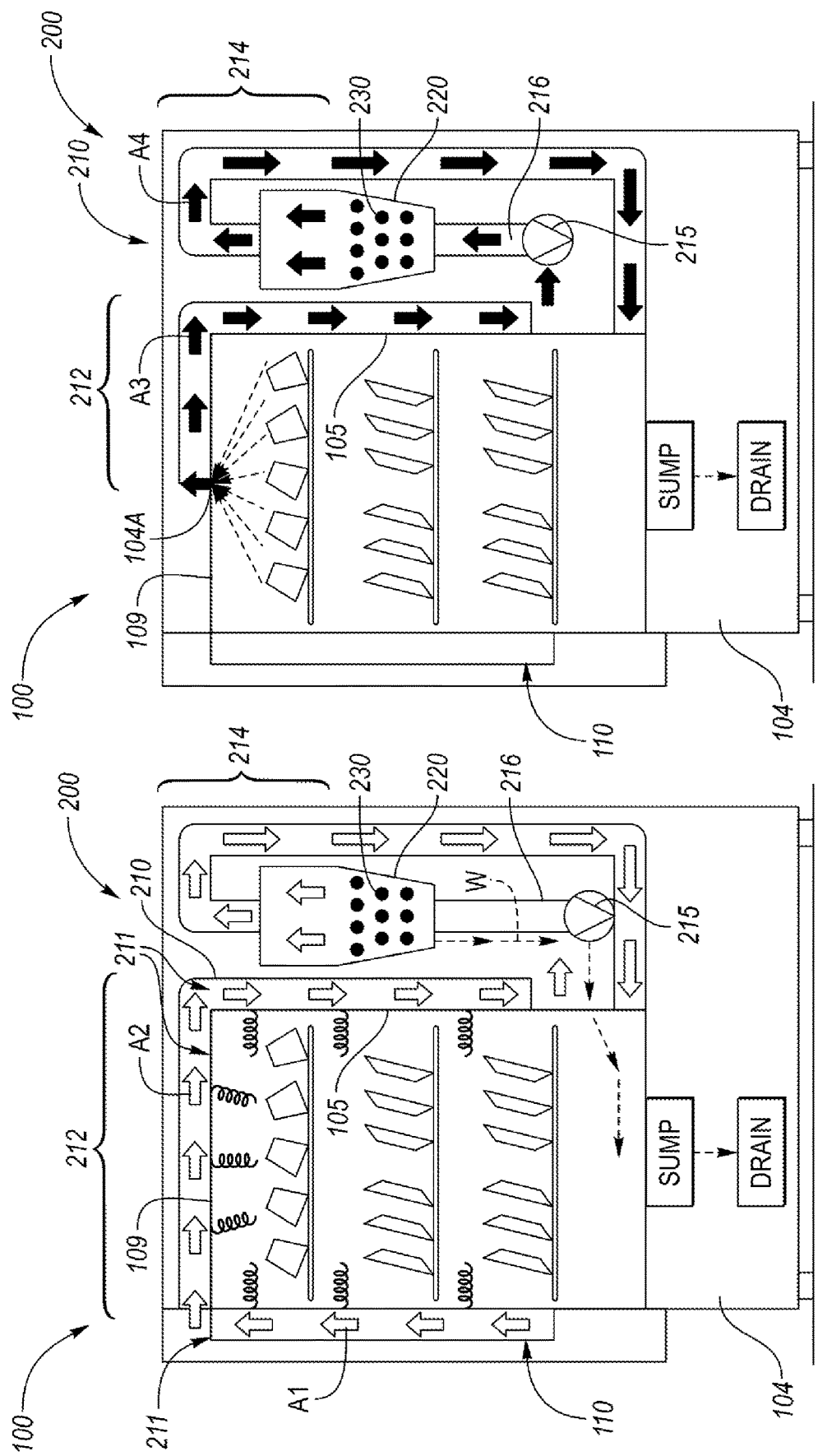
FIGS. 2A-B are schematic side views of a drying system of a dishwasher during regeneration and adsorption, respectively, according to an embodiment.

Referring to FIGS. 2A-B, the tub 104 of the dishwasher 100 is shown schematically with a drying system 200, according to an embodiment. The dishwasher 100 is schematically shown without the frame 102 with only the tub 104 and the relevant components of the drying system 200 shown, which is not intended to be limiting, as the dishwasher 100 includes other components and features for operation that have been removed to more clearly show the drying system 200. As such, an external surface 103 of the tub 104 of the dishwasher 100 is shown in FIGS. 2A-B with the drying system 200 positioned on at least a portion of the external surface 103.

Referring again to FIGS. 2A-B, the drying system 200 includes an air circuit 210 for supplying an airflow to a fluidized bed 220 to fluidize and contact an adsorbent material 230, and returning the airflow to the tub 104. The airflow through the air circuit 210 suspends the adsorbent material 230 within the fluidized bed 220 such that the adsorbent material 230 behaves as a fluid to improve heat transfer and adsorption of the adsorbent material 230 via contact with the airflow. The fluidized bed 220 is a packed bed of the adsorbent material 230, which has water stored therein which needs to be regenerated (i.e., water needs to be released from the adsorbent material 230) during the wash cycle. The fluidized bed 220 may have a Venturi type design, and be configured to receive the airflow from bottom to top to result in fluidization of the adsorbent material 230 which enhances heat transfer through the entire adsorbent material 230. The fluidized bed 220 may be a continuous bed or a sectionalized bed to improve distribution and uniformity of flow therethrough. Fluidization keeps solid particles of the adsorbent material 230 suspended by an upward flow of gas (i.e., the airflow). The fluidization occurs at minimum air velocity at which the forces (drag and weight) are balanced. For example, the introduction of air at the inlet of the fluidized bed 220 is at an inlet air velocity exceeding the minimum fluidization velocity of the fluidized bed 220. At this condition, the particles of adsorbent material 230 float in the airflow in the fluidized bed 220, with each particle being separated from another and surrounded by air and free to move. In this state, the particle of adsorbent material 230 assumes the properties of a liquid or a fluid. As such, this behavior improves regeneration of adsorbents during a wash cycle. During the dry cycle, the hot humid air from the tub 104 similarly flows through the fluidized bed 220 to contact and fluidize the adsorbent material 230 for dehumidification, enhancing adsorption via the adsorbent material 230 having additional surface area being contacted by the airflow. The fluidized bed 220 results in the adsorbent material 230 having a high surface contact area between the airflow and adsorbent material per unit bed volume, and high intermixing of the adsorbent material 230 phase. The fluidized bed may include any suitable adsorbent material 230 as based on performance and drying requirements, and as such, the fluidized bed 220 may have a corresponding packing fraction, particle size, shape and air flow rate, as based on the selected adsorbent material 230.

The air circuit 210 includes an air inlet 212 for flowing hot humid air (shown as humid air A3 in FIG. 2B) from the tub 104 or ambient air (shown as ambient air A1, heated to heated ambient air A2, in FIG. 2A) from air vent 213 in the door assembly 110 to the fluidized bed 220 for contacting the adsorbent material 230, and an air outlet 214 for flowing air from the fluidized bed 220 back to the tub 104. In certain embodiments, not shown in FIGS. 2A-B, one or more fans may be included along the air circuit 210 for drawing air through the air circuit 210. The one or more fans may be included in the air circuit before and/or after the fluidized bed 220. Furthermore, valves (e.g., valve 215) directing airflow may be used in combination with the fans to direct the airflow through the fluidized bed 220 for absorption and regeneration of absorbent material 230. The air inlet 212 is in fluid communication with the fluidized bed 220 to allow air to flow into the fluidized bed 220 when a valve 215 positioned along the air inlet 212 is in an open position, and prevents air from entering the fluidized bed 220 when the valve 215 is in a closed position. The valve 215 may be activated by an actuator (not shown) (e.g., a motor, linear actuator, such as a wax actuator, solenoid, or similar suitable actuator) to open and close the valve 215. In certain embodiments, the valve 215 may be biased in the closed position (e.g., by a spring) such that the valve 215 is actuated by exerting a force on the valve 215. For example, air pressure from the airflow exerted on the valve 215 may open the valve 215.

The air inlet 212 includes at least one region 211 in contact with at least one portion of the external surface 103 of the tub 104 such that heat is transferred from the tub 104 to the airflow within the region 211 (e.g., a tub side wall 105, a tub top wall 109, and/or through the door assembly 110). Although the region 211 is shown contacting all three of the tub side wall 105, the tub top wall 109, and the door assembly 110, the region 211 of the air inlet 212 may be in contact with one or more surface(s) of the external surface 103 of the tub 104, and the schematic illustration showing the extension of the air inlet 212 and the region 211 as contacting each surface of the tub 104 is not intended to be limiting. For example, although not shown, in another embodiment, the air vent 213 may be vertically higher in the door assembly 110, such that the region 211 extends across the tub top wall 109 and down the tub side wall 105 (shown as a rear wall). Moreover, in other embodiments, the air inlet 212 may only contact the tub top wall 109, defining the region 211, and may not contact a tub side wall 105 en route to the fluidized bed 220. As such, the region 211 of the air inlet 212 may be configured in a suitable arrangement to be in contact with an external surface 103 of the tub 104 such that heat can be conducted from the tub 104 and to the air inlet 212 to warm the airflow therethrough. For example, as shown in FIG. 2A, the ambient air A1 is heated to heated ambient air A2 by traveling through the region 211 of the air inlet 212 (i.e., through the door assembly 110, along the tub top wall 109 and the tub side wall 105), before entering the fluidized bed 220.

Upon entering the fluidized bed 220, the airflow suspends the adsorbent material 230 such that it behaves as a fluid within the fluidized bed 220 for regeneration and adsorption during a regeneration cycle and a drying cycle, respectively. In certain embodiments, as shown in FIGS. 2A-B, the fluidized bed 220 may be positioned in the dishwasher 100 such that the fluidized bed 220 is not in direct contact with the tub side wall 105. By isolating the fluidized bed 220 from the tub 104, the temperature of the fluidized bed 220 can remain lower than if heat is being conducted from the tub 104 to the fluidized bed 220, allowing for the adsorbent material 230 to have a higher moisture intake capacity. In certain embodiments, the temperature of the fluidized bed 220 during adsorption is 30 to 85 degrees C., in other embodiments 35 to 80 degrees C., and in yet other embodiments 40 to 75 degrees C. The positioning of the region 211 of the air inlet 212 allows for heat from the interior of the tub 104 to conduct through the tub side wall 105, the door assembly 110, and/or the tub top wall 109 and to heat the ambient airflow therethrough during the regeneration cycle (i.e., a wash cycle), such that the heated ambient air is flowed through the fluidized bed 220 to contact the adsorbent material 230 to regenerate (i.e., release moisture in the form of water from) the adsorbent material during the wash cycle. Based on the air circuit 210 shape and the position of the air circuit 210 in the dishwasher 100, the water released from the adsorbent material 230 can be released and drained via gravity to the tub 104.

The adsorbent material 230 is a material suitable for drying the humid air from the tub 104 during a drying cycle. The adsorbent material may be any suitable adsorbent material capable of being fluidized under a flow of fluid and perform to achieve desired drying requirements, such as, but not limited to a sorbent nanomaterial. The nanomaterial may be a sponge-like nanomaterial, or other suitable nanomaterial capable of regeneration and reducing the energy burden required to absorb and desorb water vapor from the airflow through the drying system 200. Thus, the adsorbent material 230 provides energy-efficient humidity management, enable more efficient desiccant operation, and allow for atmospheric water extraction designs to be implemented. The nanomaterial adsorbents function like traditional desiccants, but use less energy to regenerate (i.e., eject their water vapor load) at a much lower temperature than traditional desiccants. For example, the regeneration temperature of the adsorbent material in certain embodiments may be 30 to 65° C. in some embodiments, 35 to 63° C. in other embodiments, and 40 to 60° C. in yet other embodiments, whereas in conventional desiccants, the regeneration temperature may be up to 200° C., and upwards of 65° C. The adsorbent material 230 may be capable of storing up to 300 mL of water, which can be released upon regeneration for draining. The lower regeneration requirements of the adsorbent material 230 results in improved energy-efficiency and lower temperature exhaust as external heaters are not needed in the drying system 200 for regeneration or for heating the ambient air stream. As such, the adsorbent material 230 may have a regeneration temperature of 30 to 65° C., which is reached via heating the ambient airflow during regeneration by conductive heat transfer from the interior of the tub 104 during a wash cycle, and fluidizing the adsorbent material 230 in the fluidized bed 220 to contact the heated ambient air flow with the adsorbent material 230. As such, the adsorbent material is regenerated via ambient air heated from the tub 104, without any additional heating components for regenerating the adsorbent material or for heating an air stream to regenerate the adsorbent material.

With reference to FIG. 2A, during a regeneration cycle (i.e., a wash cycle of the dishwasher 100), the ambient air A1 enters the air circuit 210 via the air vent 213 in the door assembly 110, or another air path (i.e. cabinet to tub gap) (not shown), and flows through the region 211 of the air inlet 212 which is in contact with the external surface 103 of the tub 104. The other air paths for air A1 may be, in further examples, into the air circuit 210 through louvres in the door seal. Heat emanating out of the tub 104 from the wash cycle is conducted through the tub side wall 105, tub top wall 109 and/or into the door assembly 110, and transferred to the ambient air A1 flowing through the region 211 of the air inlet 212 to form heated ambient air A2. The heated ambient air A2 may have any suitable temperature for regenerating the adsorbent material 320, such as, for example, 35 to 45 degrees C. In one or more embodiments, the air A1 flowing through the region 211 of the air inlet 212 may be routed based on identified hot spots on the tub. This heated air A2 is supplied to the fluidized bed 220 through the valve 215. Humid air from the tub 104 is blocked from entering the air circuit 210 during the wash cycle via a sealing valve (not shown) which seals the adsorbent material from the humid air from the tub 104 during the wash cycle. This sealing valve allows the heated ambient air A2 to regenerate the adsorbent material during the wash cycle. The heated air A2 flows through the fluidized bed 220 from bottom to top, and keeps the particles of the adsorbent material 230 suspended in the upward flow of the heated air A2 to enhance heat transfer and regenerate the adsorbent material 230 (which is a hydrated adsorbent material 230 from a previous dry cycle) such that it releases water. In at least one embodiment, as shown in FIG. 2A, the heated air A2 exiting the fluidized bed 220 into air outlet 214 is returned to the tub 104 via tub inlet 104B. In other embodiments, the heated air A2 exits the fluidized bed 220 into air outlet 214 and may be vented to the external environment. The water released from the adsorbent material 230 is flowed as water W from the fluidized bed 220 to be drained via the sump of the dishwasher 100.

With reference to FIG. 2B, during a dry cycle (i.e., after the wash cycle) of the dishwasher 100, hot humid air A3 enters the air circuit 210 from the tub 104 via the tub outlet 104A. The ambient air A1 is blocked from entering the air circuit 210 during the dry cycle via the sealing valve or a separate sealing valve (not shown). Hot humid air A3 is flowed via the air inlet 212 to the fluidized bed 220, through the valve 215. The hot humid air A3 flows through the fluidized bed 220 from bottom to top, and keeps the particles of the adsorbent material 230 suspended in the upward flow of the hot humid air A3 to allow the adsorbent material 230 to absorb moisture (i.e., water) from the hot humid air A3, to form a dry air stream A4 exiting the fluidized bed 220. In at least one embodiment, as shown in FIG. 2B, the dry air stream A4 exiting the fluidized bed 220 into air outlet 214 is returned to the tub 104 via tub inlet 104B to continue drying the load in the dishwasher 100. In other embodiments, the dry air stream A4 exits the fluidized bed 220 into air outlet 214 and may be vented to the external environment. As such, the adsorbent material 230 retains moisture until a subsequent wash cycle, as in FIG. 2A, where heated air A2 regenerates the adsorbent material 230 for the next dry cycle of the dishwasher 100.

Referring again to FIGS. 2A-B, the drying system 200 includes a conduit 216 coupled between the valve 215 and the fluidized bed 220 for flowing air into the fluidized bed 220 at flow rates (i.e., velocities) required for fluidization of the adsorbent material 230. The air may be fluidized by any suitable mechanism, including, but not limited to, one or more nozzles to distribute the flow, a rotating spray arm, baffles for redistributing airflow, a sparger, or other suitable mechanism which can uniformly and efficiently fluidize the air.

Referring to FIGS. 3A-B, the drying system 200 is shown according to a further embodiment. The drying system 200 includes the components and features as discussed with respect to FIGS. 2A-B. However, as a mechanism for fluidizing the air, for example, the conduit 216 may further include a sparger 218 at the entrance of the fluidized bed 220 which alters the flow profile of the air flowing therethrough to provide a uniform distribution of air for suspending the adsorbent material 230 within the fluidized bed 220. The sparger 218 may be a disk with a plurality of holes for allowing the air to flow therethrough, with the plurality of holes in a pattern to form a flow profile with specific flow rates that fluidize the adsorbent material 230 in the fluidized bed 220. The sparger 218 may have any suitable design that achieves a uniform air distribution into the fluidized bed 220, allows for the adsorbent material 230 to be suspended with effective interfacial area and reduced dead zones, and therefore improves heat and mass (e.g., water) transfer. Thus, the sparger 218 can improve the efficiency of the fluidized bed 220 during regeneration and adsorption. Although shown as a sparger 218, as previously discussed, the drying system 200 may include any suitable mechanism for distributing the flow profile (e.g., baffles, spray arm, nozzles, etc.).

Furthermore, in the embodiment shown in FIGS. 3A-B, the fluidized bed 220 includes the adsorbent material 230, and also includes a carbon nanomaterial 240. The carbon nanomaterial 240 is included in the fluidized bed 220 and similarly fluidizes under the airflow therethrough. The carbon nanomaterial 240 is in contact with the adsorbent material 230 as they are behaving as fluids in the fluidized bed 220 such that the thermal conductivity of the adsorbent material 230 is increased, which in turn, improves heat and mass transfer. The carbon nanomaterial 240 is a thermally conductive material, such as functionalized carbon nanotubes (CNTs), which also exhibits superhydrophobic properties to facilitate moisture absorbance of the adsorbent material 230. The carbon nanomaterial 240 has suitable properties (e.g., size, ratio, thermal conductivity, etc.) for improving the thermal conductivity of the fluidized bed 220, while also being fluidized in the fluidized bed. Thus, the carbon nanomaterial 240 can improve both regeneration and drying performance of the adsorbent material 230 as it is contacted with heated ambient air A2 and hot humid air A3, respectively.

Figures 4A, 4B:
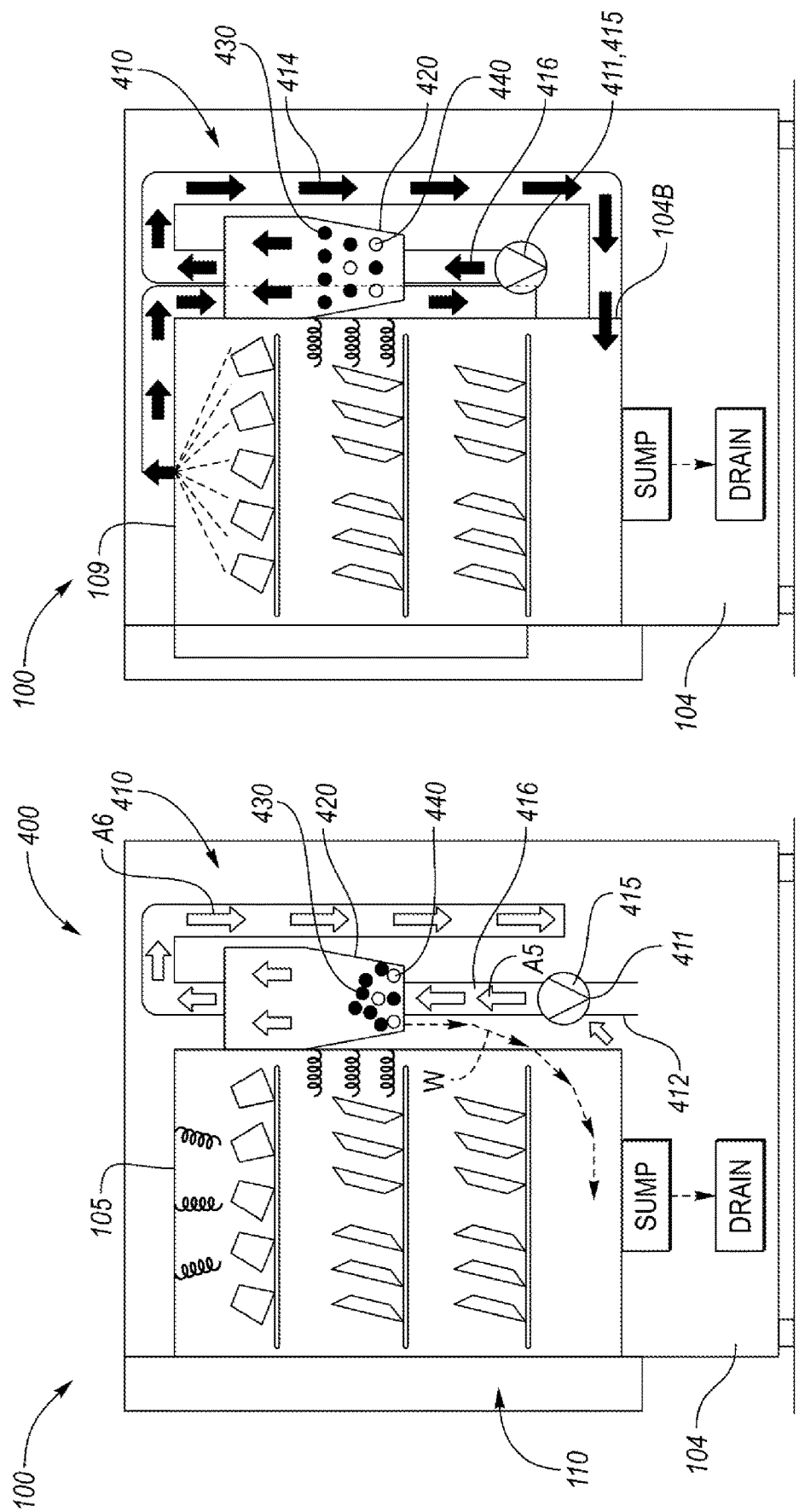
FIGS. 4A-C are schematic side views of a drying system of a dishwasher during regeneration, cooling, and adsorption, respectively, according to yet another embodiment.

Referring to FIGS. 4A-B, the tub 104 of the dishwasher 100 is shown schematically with a drying system 400, according to another embodiment. The dishwasher 100 is schematically shown without the frame 102 with only the tub 104 and the relevant components of the drying system 400 shown, which is not intended to be limiting, as the dishwasher 100 includes other components and features for operation that have been removed to more clearly show the drying system 400. As such, an external surface 103 of the tub 104 of the dishwasher 100 is shown in FIGS. 4A-B with the drying system 400 positioned on at least a portion of the external surface 103.

Referring again to FIGS. 4A-C, the drying system 400 includes an air circuit 410 for supplying an airflow to a fluidized bed 420 to fluidize and contact an adsorbent material 430 and a carbon nanomaterial 440 therein, and return the airflow to the tub 104. The airflow through the air circuit 410 suspends the adsorbent material 430 and the carbon nanomaterial 440 within the fluidized bed 420 such that the particles behave as a fluid to improve heat transfer and adsorption of the adsorbent material 430 via contact with the airflow. The fluidized bed 420 is a packed bed of the carbon nanomaterial 440 (as described previously with respect to FIGS. 3A-B), and adsorbent material 430 which absorbs water during a drying cycle, which needs to be regenerated (i.e., water needs to be released from the adsorbent material 430) during a wash cycle. The fluidized bed 420 is similar to the fluidized bed 220 of the drying system 200, and features of the fluidized bed 420 are similar to those described in the drying system 200. During the wash cycle (i.e., during regeneration shown in FIG. 4A), the adsorbent material 430 is regenerated via the fluidized bed's 420 position against the tub side wall 105, and heat conduction therethrough from the tub 104 to the adsorbent material 430 (and carbon nanomaterial 440) in the fluidized bed 420. The carbon nanomaterial 440 facilitates heat conduction through the fluidized bed 420. The heat conduction from the tub 104 to the fluidized bed 420 may be in addition to heated ambient airflow therethrough, in some embodiments, or may provide enough heat for regeneration without additional dry heated airflow through the fluidized bed 420 in other embodiments. The adsorbent material 430 is a material suitable for drying the humid air from the tub 104 during a drying cycle, as described with respect to drying system 200 and the adsorbent material 230. As such, water is released from the adsorbent material 430 and drained from the drying system 400 (e.g., via tub 104 and/or the sump).

After the adsorbent material 430 is regenerated, and before the dry cycle begins, the adsorbent material 430 is cooled via an ambient air flow A5, as shown in FIG. 4B. The ambient air flow A5 enters the air circuit 410 via a vent 413 in the air circuit, to supply ambient air form the external environment. The ambient air flow A5 is blocked from entering the fluidized bed 420 during the wash cycle and the dry cycle by valve 415. After the wash cycle, and before the dry cycle, the valve 415 opens to allow the ambient air flow A5 into the fluidized bed, via conduit 416. The conduit 416, in certain embodiments, includes a sparger as described in drying system 200 with respect to sparger 218. The ambient air flow A5 has a temperature of 20 to 25 degrees C., and is flowed into the fluidized bed 420 to fluidize the adsorbent material 430 and carbon nanomaterial 440 therein. The ambient air flow A5 cools the regenerated adsorbent material 430 to prepare the adsorbent material 430 for the dry cycle such that adsorption can be optimized by the lowered temperature of the adsorbent material 430. As such the ambient air flow A5 is heated through flow through the fluidized bed 420 into heated ambient air A6, which acts as a heat recovery from the regeneration phase. In certain embodiments (not shown), this heat in the heated ambient air A6 may be utilized during the dry cycle to heat the dehumidified air before it enters the tub 104. In other embodiments, the heated ambient air A6 may be vented to the external environment.

During the dry cycle (i.e., during adsorption shown in FIG. 4C), the hot humid air A7 from the tub 104 similarly flows through the fluidized bed 420 to contact and fluidize the adsorbent material 430 for dehumidification and the carbon nanomaterial 440, enhancing adsorption via the adsorbent material 430 having additional surface area being contacted by the airflow and the superhydrophobicity of the carbon nanomaterial 440. The fluidized bed 420 results in the adsorbent material 430 having a high surface contact area between the airflow and adsorbent material per unit bed volume, and high intermixing of the adsorbent material 430 phase.

The air circuit 410 includes an air inlet 412 for flowing hot humid air (shown as humid air A7 in FIG. 4C) from the tub 104 to the fluidized bed 420 for contacting the adsorbent material 430, and an air outlet 414 for flowing dehumidified air A8 from the fluidized bed 420 back to the tub 104. In certain embodiments, a fan may be included along the air circuit 410 for drawing air through the air circuit 410. For example, in FIGS. 4A-C, a fan 411 is positioned with the valve 415 to flow air into the air inlet 412. The air inlet 412 is in fluid communication with the fluidized bed 420 to allow air to flow into the fluidized bed 420 when the valve 415 positioned along the air inlet 412 is in an open position. The valve 415 prevents air (e.g., hot humid air from the tub 104 or ambient air) from entering the fluidized bed 420 when the valve 415 is in a closed position. The valve 415 may be activated by an actuator (not shown) (e.g., a motor, linear actuator, such as a wax actuator, solenoid, or similar suitable actuator) to open and close the valve 415. In certain embodiments, the valve 415 may be biased in the closed position (e.g., by a spring) such that the valve 415 is actuated by exerting a force on the valve 415. For example, air pressure from the airflow exerted on the valve 415 may open the valve 415.

Upon entering the fluidized bed 420, the airflow (i.e., the ambient air A5 or the hot humid air A7) suspends the adsorbent material 430 such that it behaves as a fluid within the fluidized bed 420 (for cooling and adsorption, respectively). In the embodiment shown in FIG. 4A, the fluidized bed 420 may be positioned in the dishwasher 100 such that the fluidized bed 420 is in direct contact with the tub side wall 105. This allows for heat conduction from the tub 104 through the tub side wall 105 to heat the adsorbent material 430 and carbon nanomaterial 440 in the fluidized bed 420 such that the adsorbent material 430 can be regenerated. Upon regeneration (i.e., releasing of moisture in the form of water) of the adsorbent material during the wash cycle, the water released from the adsorbent material 430 can be released and drained via gravity to the tub 104 or directly drained to the sump.

With reference again to FIG. 4A, during a regeneration cycle (i.e., a wash cycle of the dishwasher 100), heat is transferred from the tub 104 (as hot water is used to wash the load in the tub 104), to the fluidized bed 420, which during regeneration, is in the form of a packed bed, as no air is flowing through the fluidized bed 420 (i.e., the valve 415 is closed to block any air from entering the conduit 416). The carbon nanomaterial 440 enhances heat conduction through the packed bed to facilitate regeneration of the adsorbent material 430. The water released from the adsorbent material 430 is flowed from the fluidized bed 420 to be drained via the sump of the dishwasher 100. Thereafter, and before the dry cycle as shown in FIG. 4B, ambient air A5 enters the air circuit 410 via the air vent 513 from an external environment, and flows through the air inlet 412 to the fluidized bed 420 through the valve 415, which is open to the ambient air A5 (and blocking humid air flow A7 from the tub 104). The ambient air A5 flows through the fluidized bed 420 from bottom to top, and keeps the particles of the adsorbent material 430 and carbon nanomaterial 440 suspended in the upward flow of the ambient air A5 to cool the adsorbent material 430 to optimize the adsorption potential during the dry cycle. Thus, the ambient air A5 cools the adsorbent material 430 and is as such heated through the fluidized bed 420 to heated ambient air A6 upon exiting the fluidized bed 420. Although shown as separate steps, the regeneration and cooling of the adsorbent material 430 may overlap prior to the dry cycle or occur simultaneously. In at least one embodiment, as shown in FIG. 4B, the heated ambient air A6 exiting the fluidized bed 420 into air outlet 414 may be returned to the tub 104 via tub inlet 104B. In other embodiments, the heated ambient air A6 exits the fluidized bed 420 into air outlet 414 and may be vented to the external environment. In yet other embodiments, the heated ambient air A6 may be used to heat dried air exiting the fluidized bed 420 during the dry cycle for return to the tub 104.

Figure 4C:
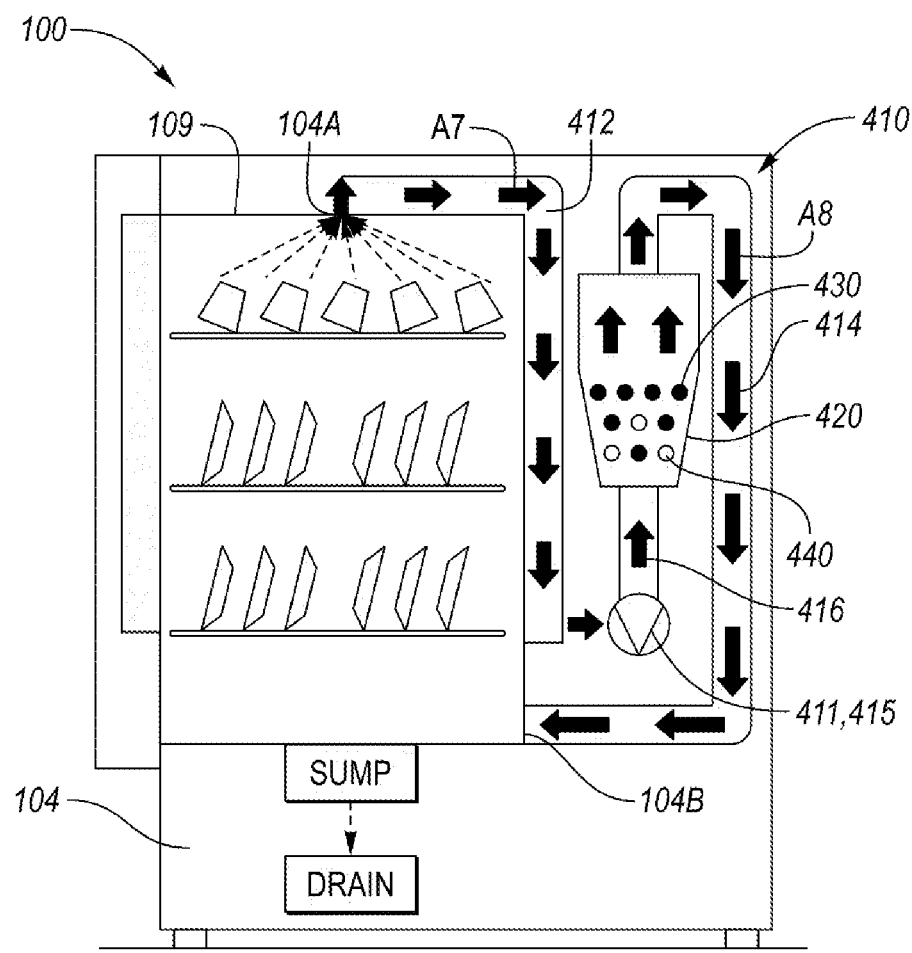

With reference to FIG. 4C, during a dry cycle (i.e., after the wash cycle) of the dishwasher 100, hot humid air A7 enters the air circuit 410 from the tub 104 via the tub outlet 104A. The ambient air A5 is blocked from entering the air circuit 410 during the dry cycle by the valve 415. Hot humid air A7 is flowed via the air inlet 412 to the fluidized bed 420, through the valve 415. The hot humid air A7 flows through the fluidized bed 420 from bottom to top, and keeps the particles of the adsorbent material 430 and the carbon nanomaterial 440 suspended in the upward flow of the hot humid air A7 to allow the adsorbent material 430 to absorb moisture (i.e., water) from the hot humid air A7, to form a dry air stream A8 exiting the fluidized bed 420. In at least one embodiment, as shown in FIG. 4C, the dry air stream A8 exiting the fluidized bed 420 into air outlet 414 is returned to the tub 104 via tub inlet 104B to continue drying the load in the dishwasher 100. In other embodiments, the dry air stream A8 exits the fluidized bed 420 into air outlet 414 and may be vented to the external environment. As such, the adsorbent material 430 retains moisture until a subsequent wash cycle, as in FIG. 4A, where heat from the tub 104 regenerates the adsorbent material 430 for the next dry cycle of the dishwasher 100.

In at least one embodiment, a method of operating a dishwasher includes running a wash cycle to clean dishes loaded into a tub of the dishwasher, and initiating a dry cycle which supplies hot air to the tub to dry the dishes to form hot humid air. The method further includes upon initiating the dry cycle, opening a gate check valve to unblock airflow from entering conduits of the drying system, and flowing the hot humid air into a drying system to fluidize adsorbent material positioned within a bed of the drying system, and forming a dry air stream to be supplied back to the tub.

During a subsequent wash cycle, the method includes regenerating the adsorbent material via heat transfer through the at least one tub wall to an ambient air stream which is supplied to the bed of the drying system such that expelled water from the adsorbent material is drained via the conduits of the drying system prior to a subsequent dry cycle.

In another embodiment, during a subsequent wash cycle the method includes regenerating the adsorbent material via heat transfer through the at least one tub wall to the bed to heat the adsorbent material and expel water therefrom to be drained via the conduits prior to a subsequent dry cycle. In further embodiments, the method further includes cooling the adsorbent material prior to the dry cycle via a flowing ambient air through the conduits and fluidizing and contacting the adsorbent material to increase an adsorption potential of the adsorbent material when compared to an uncooled adsorbent material.

According to one or more embodiments, a dishwasher includes a drying system having an adsorbent material configured to regenerate using heat from the tub during a wash cycle of the dishwasher. The adsorbent material is heated either via the position of the fluidized bed against a tub wall such that heat is conducted from the tub to the fluidized bed, or via flowing an ambient air stream against at least one tub wall to heat the ambient air stream for supply to the fluidized bed to regenerate the adsorbent material. Airflow to the adsorbent material fluidizes the adsorbent material in the fluidized bed to increase adsorption and surface area/heat transfer to enhance performance of the adsorbent material.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

It should also be appreciated that integer ranges (e.g., for measurements or dimensions) explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1, to 2.1 the following numbers 1.2, 1.3, 1.4, 1.5, 1.6, 1.7, 1.8, 1.9, and 2.0 can be selected as lower or upper limits.

In the specific examples set forth herein, concentrations, temperature, and reaction conditions (e.g. pressure, pH, flow rates etc.) can be practiced with plus or minus 50 percent of the values of the examples indicated, rounded to or truncated to three significant figures. In a refinement, concentrations, temperature, and reaction conditions (e.g., pressure, pH, flow rates, etc.) can be practiced with plus or minus 30 percent of the values indicated rounded to three significant figures of the value provided in the examples. In another refinement, concentrations, temperature, and reaction conditions (e.g., pressure, pH, flow rates, etc.) can be practiced with plus or minus 10 percent of the values indicated rounded to three significant figures of the value provided in the examples.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A dishwasher comprising:
a housing having walls defining a tub having a tub outlet for humid air to flow out from the tub, and a tub inlet for dry air to flow into the tub; and
a drying system including
a fluidized bed containing an adsorbent material in a fluidized state when air is flowed through the fluidized bed, and
an air circuit having an air inlet for supplying air to fluidize the adsorbent material in the fluidized bed, and an air outlet connected to the tub inlet to flow air from the fluidized bed to the tub, with at least a portion of the air inlet in contact with at least one wall of the tub such that heat is transferred from the tub to the air therein,
wherein, during a regeneration cycle, the air circuit supplies heated ambient air to the fluidized bed which is heated via heat transfer from the tub to the air inlet to regenerate the adsorbent material, and during an adsorption cycle, the air circuit receives hot humid air at the air inlet from the tub outlet to be dried by the adsorbent material through the fluidized bed and returned as dry air to the tub via the tub inlet.

2. The dishwasher of claim 1, wherein the heated ambient air enters the air circuit as ambient air from a door assembly of the dishwasher.

3. The dishwasher of claim 1, further comprising a sparger at an entrance of the fluidized bed, the sparger being configured alter a flow profile into the fluidized bed and suspend the adsorbent material in the fluidized state.

4. The dishwasher of claim 1, wherein the fluidized bed further includes a carbon nanomaterial mixed with the adsorbent material.

5. The dishwasher of claim 1, further comprising a fan within the air circuit for drawing and flowing air therethrough for fluidizing the adsorbent material.

6. The dishwasher of claim 1, wherein during the regeneration cycle, a valve blocks hot humid air from the tub from entering the air circuit.

7. The dishwasher of claim 1, wherein during the adsorption cycle, a valve blocks ambient air from entering the air circuit.

8. The dishwasher of claim 1, wherein the fluidized bed includes a drain outlet connected to the tub to drain water formed during regeneration of the adsorbent material to the tub.

9. The dishwasher of claim 1, wherein the heated ambient air has a temperature of 35 to 45 degrees C.

10. A dishwasher comprising:
a housing having walls defining a tub having a tub outlet for humid air to flow out from the tub, and a tub inlet for dry air to flow into the tub; and
a drying system including
a fluidized bed containing an adsorbent material in a fluidized state when air is flowed through the fluidized bed, and
an air circuit having an air inlet for supplying air to fluidize the adsorbent material in the fluidized bed, and an air outlet connected to the tub inlet or a vent to flow air from the fluidized bed to the tub or an external environment, respectively, with at least a portion of the fluidized bed in contact with at least one wall of the tub such that heat is transferred from the tub to the adsorbent material therein,
wherein, during a regeneration cycle, the adsorbent material is heated via heat transfer from the tub to the fluidized bed to regenerate the adsorbent material, and during an adsorption cycle, the air circuit receives hot humid air at the air inlet from the tub outlet to be dried by the adsorbent material through the fluidized bed and returned as dry air to the tub via the tub inlet.

11. The dishwasher of claim 10, wherein prior to an adsorption cycle, the air circuit receives ambient air from the external environment to fluidize and cool the adsorbent material to increase adsorption potential of the adsorbent material.

12. The dishwasher of claim 10, wherein during the regeneration cycle, a valve blocks hot humid air from the tub from entering the air circuit and ambient air from the external environment from entering the air circuit.

13. The dishwasher of claim 10, wherein during the adsorption cycle, a valve blocks ambient air from entering the air circuit.

14. The dishwasher of claim 10, wherein the fluidized bed further includes a carbon nanomaterial mixed with the adsorbent material.

15. The dishwasher of claim 10, further comprising a sparger at an entrance of the fluidized bed, the sparger being configured to alter a flow profile into the fluidized bed and suspend the adsorbent material in the fluidized state.

16. The dishwasher of claim 10, further comprising a fan within the air circuit for drawing and flowing air therethrough for fluidizing the adsorbent material.

17. A method of operating a dishwasher comprising:
running a wash cycle to clean dishes loaded into a tub;
initiating a dry cycle to supply hot air to the tub to dry the dishes and form hot humid air;
flowing the hot humid air into a drying system to fluidize adsorbent material in a fluidized bed and contact the fluidized adsorbent material within the fluidized bed of the drying system to absorb moisture from the hot humid air and form a dry air stream for supply to the tub and a hydrated adsorbent material; and
during a subsequent wash cycle,
regenerating the adsorbent material via heat transfer through a wall of the tub to an air circuit or the fluidized bed, with at least a portion of the air inlet in contact with at least one wall of the tub such that heat is transferred from the tub to the air therein.

18. The method of claim 17, wherein regenerating the adsorbent material includes heating ambient air via the heat transfer to the air circuit to form heated ambient air, and flowing the heated ambient air to fluidize the hydrated adsorbent material in the fluidized bed and contact the fluidized hydrated adsorbent material to regenerate the adsorbent material by releasing water therefrom.

19. The method of claim 18, wherein the flowing the heated ambient air to fluidize the hydrated adsorbent material includes flowing the heated ambient air through a sparger into the fluidized bed.

20. The method of claim 17, further comprising, prior to a subsequent dry cycle, and after regenerating the adsorbent material, flowing an ambient airflow to fluidize the adsorbent material and increase adsorption potential of the adsorbent material.

* * * * *